C. A. LINDSTRÖM.
CAR CONSTRUCTION.
APPLICATION FILED AUG. 16, 1906.

917,956.

Patented Apr. 13, 1909.
10 SHEETS—SHEET 1.

Fig.1.

WITNESSES.

INVENTOR.

C. A. LINDSTROM.
CAR CONSTRUCTION.
APPLICATION FILED AUG. 16, 1906.

917,956.

Patented Apr. 13, 1909.
10 SHEETS—SHEET 5.

WITNESSES
R A Balderson
W W Swartz

INVENTOR
C. A. Lindstrom,
by Bakewell & Byrnes,
his attys.

C. A. LINDSTRÖM.
CAR CONSTRUCTION.
APPLICATION FILED AUG. 16, 1906.

917,956.

Patented Apr. 13, 1909.
10 SHEETS—SHEET 6.

WITNESSES

INVENTOR

C. A. LINDSTRÖM.
CAR CONSTRUCTION.
APPLICATION FILED AUG. 16, 1906.

917,956.

Patented Apr. 13, 1909.
10 SHEETS—SHEET 10.

WITNESSES
R A Baldwinson
W W Swartz

INVENTOR
C. A. Lindström,
by Bakewell & Byrnes,
his attys.

UNITED STATES PATENT OFFICE.

CHARLES A. LINDSTRÖM, OF ALLEGHENY, PENNSYLVANIA, ASSIGNOR TO PRESSED STEEL CAR COMPANY, OF PITTSBURG, PENNSYLVANIA, A CORPORATION OF NEW JERSEY.

CAR CONSTRUCTION.

No. 917,956.      Specification of Letters Patent.      Patented April 13, 1909.

Application filed August 16, 1906. Serial No. 330,808.

*To all whom it may concern:*

Be it known that I, CHARLES A. LINDSTRÖM, of Allegheny, Allegheny county, Pennsylvania, have invented a new and useful Improvement in Car Construction, of which the following is a full, clear, and exact description, reference being had to the accompanying drawings, forming part of this specification, in which—

My invention relates to the class of steel cars, particularly gondola cars, having flat bottoms provided with downwardly opening doors, and has particular relation to the construction of the underframe, my object being to provide means which will insure the discharge of the load at the sides of the cars. In this type of cars, with the diaphragms as heretofore constructed and arranged, the downwardly opening doors commence to discharge their load shortly after they commence to open, the lading falling over the side edges of the doors and underneath the car, and lodging on the projecting angles or flanges on the diaphragms.

My invention consists in providing means whereby this objection is obviated and the lading is caused to be discharged over the free or outer edge portion of the doors when opened, and is prevented from falling over the side edges thereof. To this end, I arrange the doors between a series of transversely arranged cross-members or diaphragms having vertical smooth outer surfaces, free from projections in the path of the lading when discharging, and between and in close proximity to which the doors move in opening, and which extend as integral portions of the diaphragm to a sufficient depth to form guards for the side edges of the doors throughout the major portion of their lengths when opened.

My invention also consists in the novel construction, of the cross-members or diaphragms whereby they form guards for the doors in the manner described, and whereby they also provide interior spaces for the location of any suitable door-operating mechanism.

My invention also consists in the novel construction, arrangement and combination of parts, all substantially as hereinafter described and pointed out in the appended claims.

In the drawings, the numeral 2 designates the side sheets of the car body, 3 the end sheet, and 4 the center sill. This center sill is shown as being of the construction described and claimed in my application Serial No. 282,754, filed October 14th, 1905, patented October 16, 1906, No. 833,402, being constructed of two side members having their intermediate portions bent upwardly and inwardly, as at 4ª to permit a maximum opening movement of the doors, and terminating at their upper ends in vertical flanges 4ᵇ between which a narrow floor or ridge member 4ᶜ is secured, said member providing spaces for the location of the hinges 5 of the downwardly opening doors 6. 7 designates door-operating shafts, which may be of any suitable character, and arrangement, as the door operating mechanism forms no part of my present invention.

In the drawings, I have shown the shaft as being of the character described and claimed in the patent to Lindstrom and Streib, No. 791,348, dated May 30th, 1905, but any other suitable door-operating mechanism may be employed.

The numeral 8 designates one of the bolster diaphragms or beams and 9 designates intermediate members, diaphragms or beams.

10, (Figs. 17 and 18), designates one of the end beams, sills or diaphragms. The doors 6 are hinged at 5 between these cross-members or diaphragms, and constitute the major portion of the floor of the car.

The diaphragms may be of various forms of construction, but in general they consist in a deep hollow box-like structure extending integrally down and outwardly to the dotted lines x—x a sufficient distance to form guards for the doors when opened for the major portion of their lengths, or to a point in the vertical plane of the car rails, which plane is represented by lines x—x and having their external vertical surfaces free from projections in the path of the discharging lading which would interfere with such discharge. These cross-members or diaphragms are provided with parallel outer vertical sides between and in more or less close proximity with which the transverse edges of the doors 6 move in opening. They are also provided with the brackets 11 which form supports for the doors in their open positions, these brackets being placed as low and as near to the sides of the car as possible in order to bring the point of support as near the free edges of the doors as may be. They are arranged in inclined planes parallel with the planes of the doors when opened, and form extended bearing surfaces on which the doors rest. These brackets, may, however be omitted, and the doors stopped and supported in any other suitable way. It will be readily seen that these diaphragms form guards which prevent the escape of the lading over the transverse edges of the doors and falling between the car tracks, and which cause the lading to be discharged over the free ends of the doors and at the sides of the car. These diaphragms thus form with the doors when in open position discharge chutes. The hollow box-like form of the diaphragms not only gives them great strength, but it also provides interior spaces in which the door-operating connections in accordance with other inventions which will form the subject-matter of other applications, may be arranged and protected.

Figure 1:
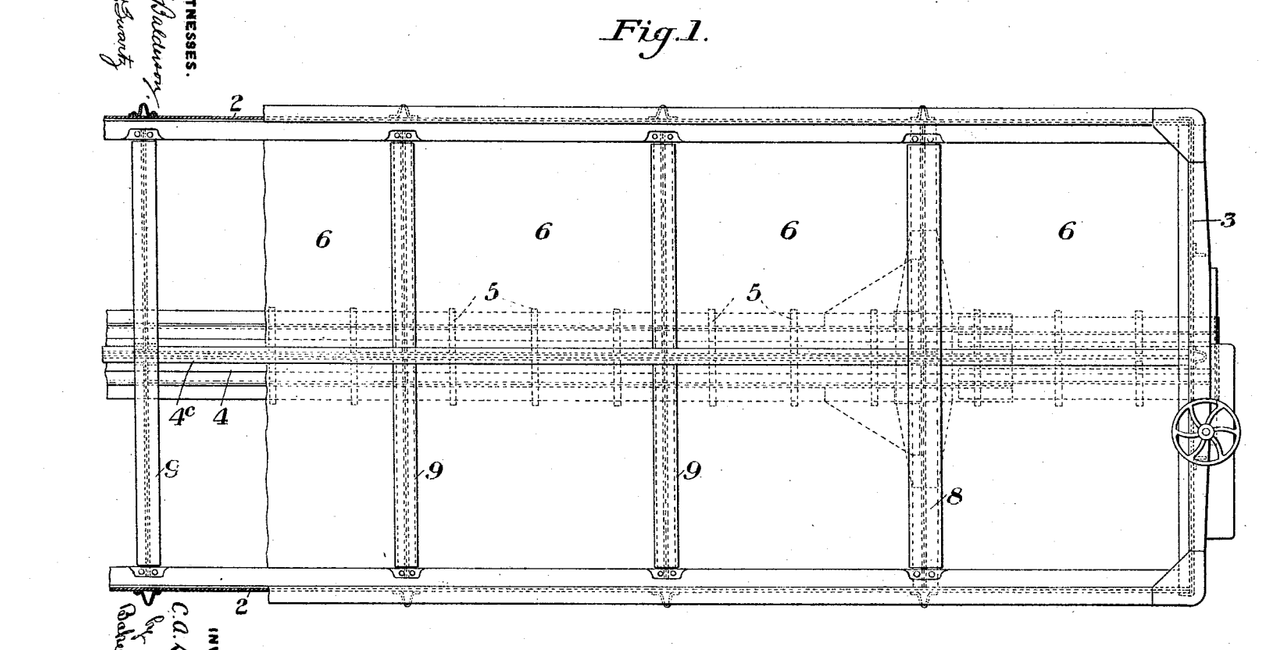
Figure 1 is a plan view of a portion of a car embodying my invention, with parts broken away.
Figure 2:
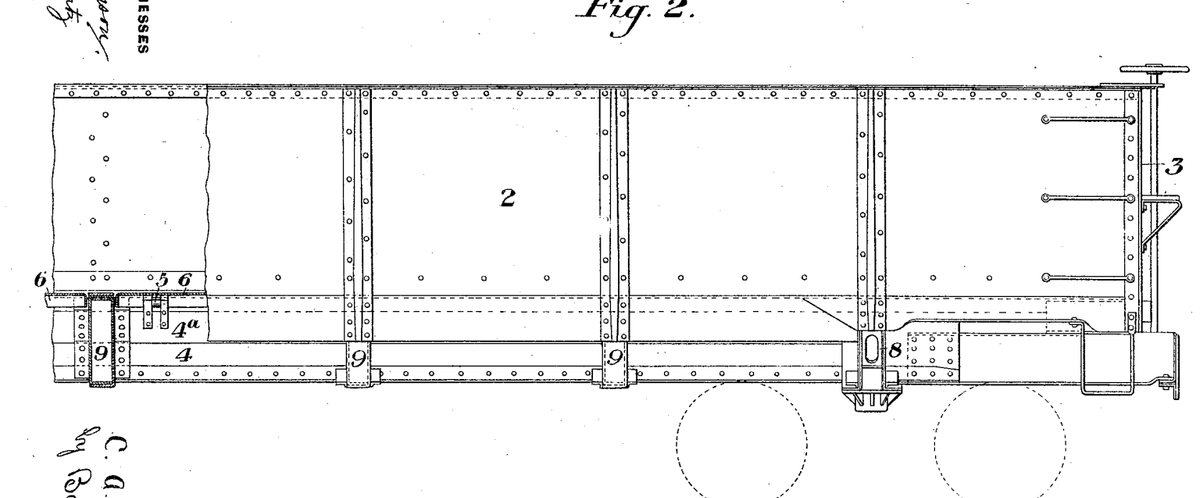
Fig. 2 is a side elevation of the same with the side sheet partially broken away, and some of the parts in section.
Figure 3:
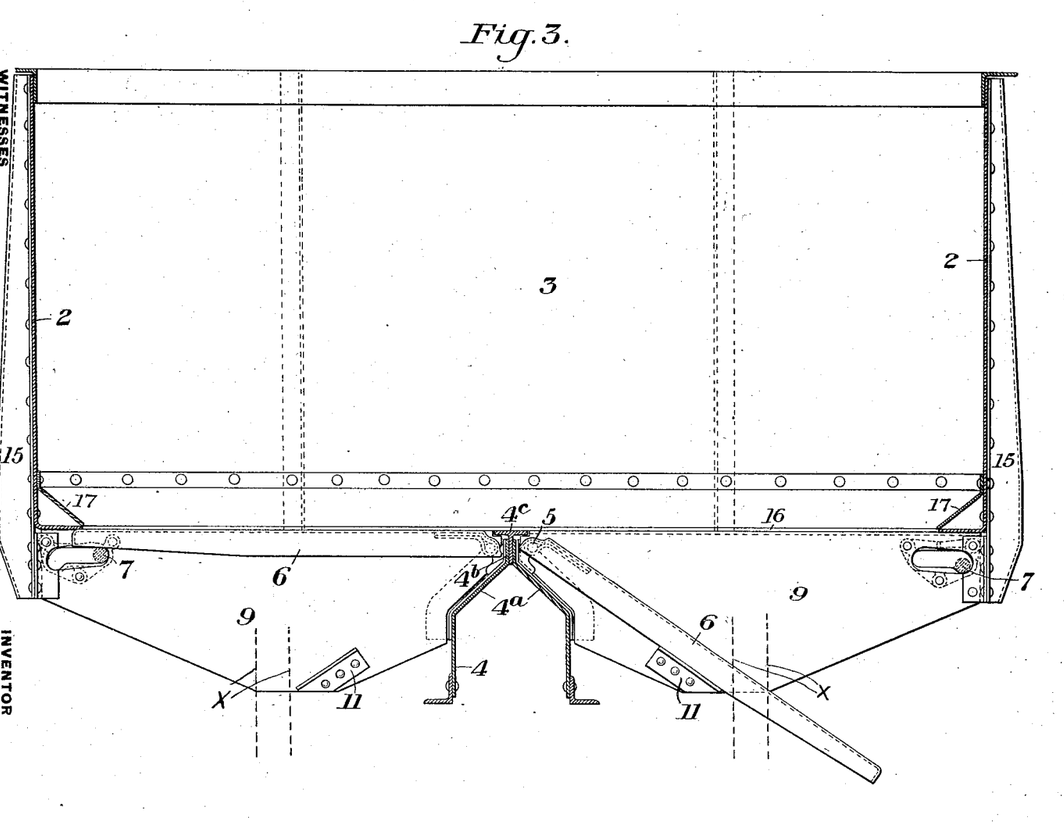
Fig. 3 is a transverse section on a larger scale, with one of the doors in open position.
Figures 4, 6:
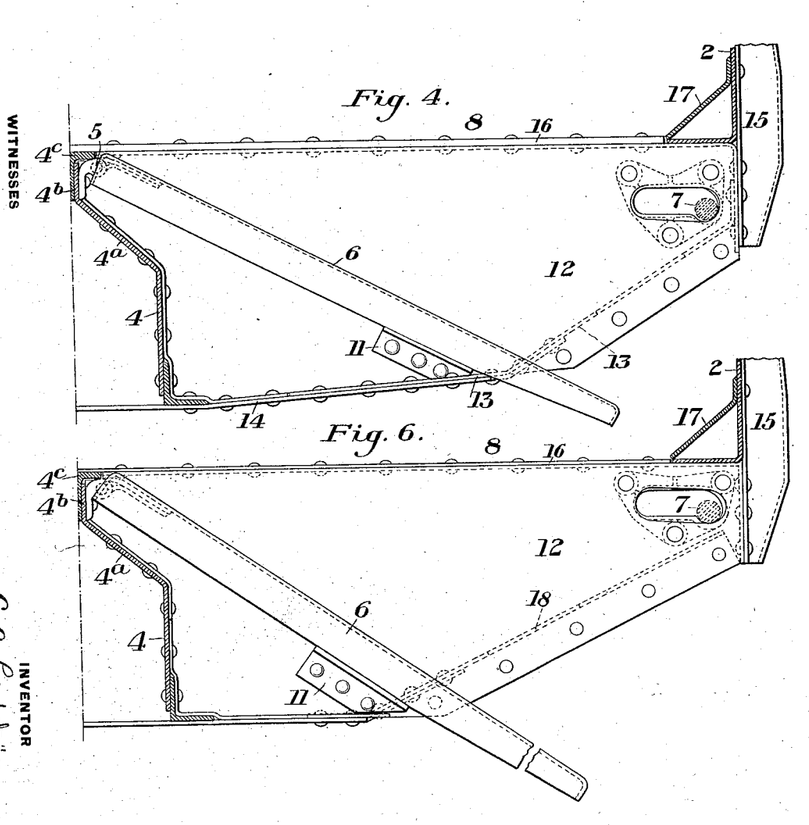
Fig. 4 is a view partly in section showing one of the bolster diaphragms.
Figs. 6 and 7 are views corresponding respectively to Figs. 4 and 5, but showing a modification.
Figure 5:
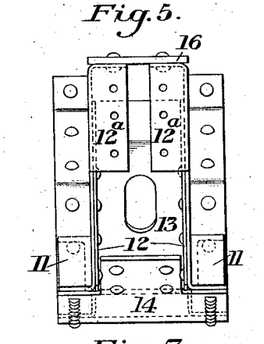
Fig. 5 is an end view of the same with the side sheet removed.

As shown in Figs. 4 and 5, the diaphragm consists of two parallel side members 12 which gradually decrease in depth toward their outer end portions and a bottom member 13, which is also carried by and secured to one of the center sill plates 4. The bottom member 13 is also secured to the lower tie plate 14, upon which the center sill rests. The outer end portions of the side plates 12 are bent inwardly, as at 12ª, and are secured to the stiffening angles or stake flanges 15 and the side sheets 2. 16 is a floor plate, and 17 an inclined shedding strip for preventing the lodgment of the lading in the outer corner portion of the car.

Figure 7:
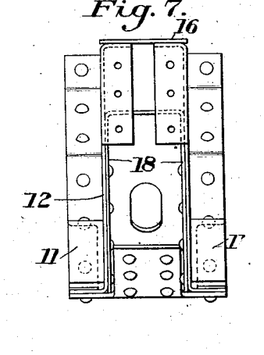

The construction shown in Figs. 6 and 7 is similar to that shown in Figs. 4 and 5, with the exception that the diaphragm is reinforced at the bottom by means of a channel piece 18.

Figures 8, 10:
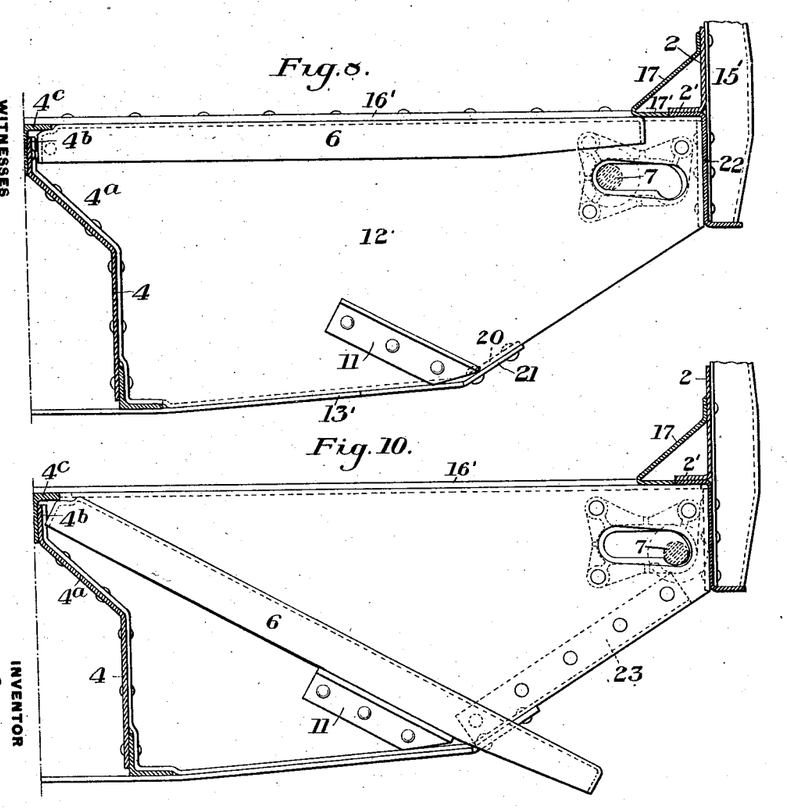
Figs. 8 and 9 are views similar to Figs. 4 and 5, but showing another modification.
Figs. 10 and 11 are views corresponding respectively to Figs. 4 and 5, but showing a third modification.
Figure 9:
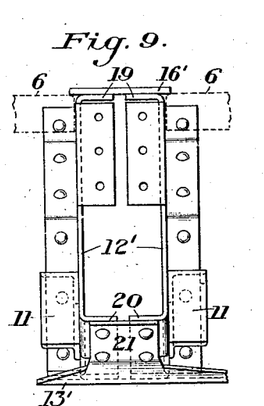

In the form shown in Figs. 8 and 9, the edges of the side plates 12′ are turned inwardly at top and bottom, as shown at 19 and 20, the floor plate 16′ being secured to the internal flanges 19, and the upturned end 21 of the bottom plate 13′ secured to the inturned edges 20. Separate end side plates 22 of Z-form are provided, to which the stake flanges 15′ are riveted. The lower flange of the Z is bent outwardly underneath the lower end of the stake strip, and its upper flange is bent inwardly underneath the inwardly turned flange 2′ of the end sheet and abuts the downwardly turned flange 17′ of the shedding strip.

Figure 11:
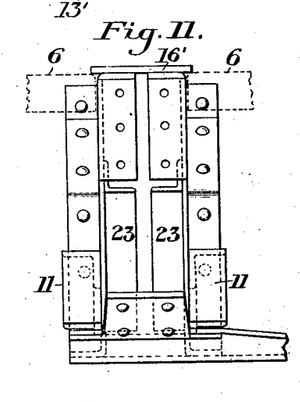

The construction shown in Figs. 10 and 11 is similar to that shown in Figs. 8 and 9, except that internal reinforcing angles 23 are provided.

Figure 12:
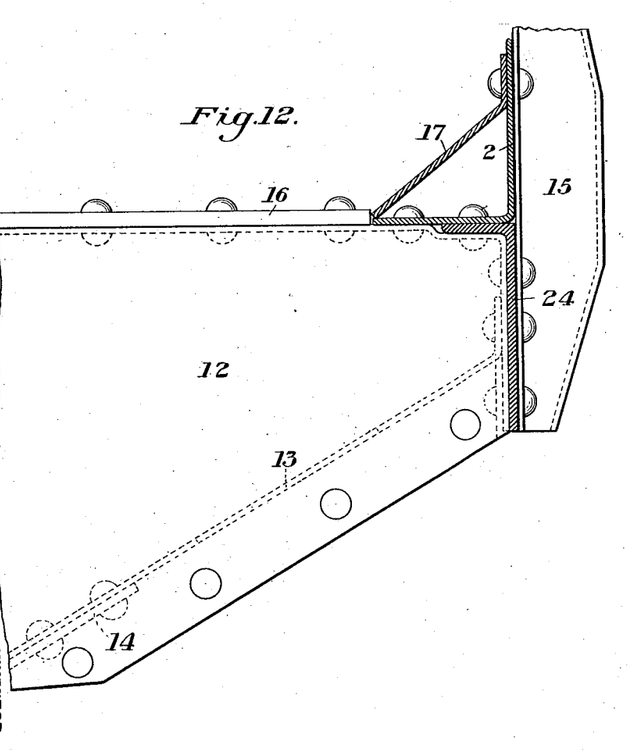
Fig. 12 is a view of one end portion of one of the diaphragms or cross-members showing another modification.
Figure 13:
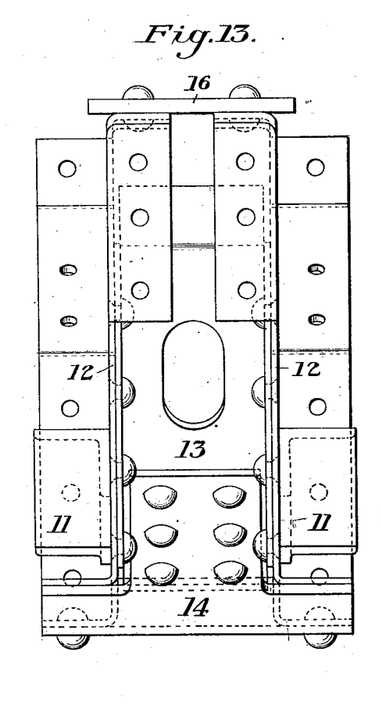
Fig. 13 is an end view of the construction shown in Fig. 12 with the side sheet removed.

In the construction shown in Figs. 12 and 13, the side sheet 2 is bent inwardly at its lower end underneath the shedding strip 17, and is secured to angles 24, to which the lower end portions of the stake flanges 15 and also the bottom member are secured.

Figures 14, 15:
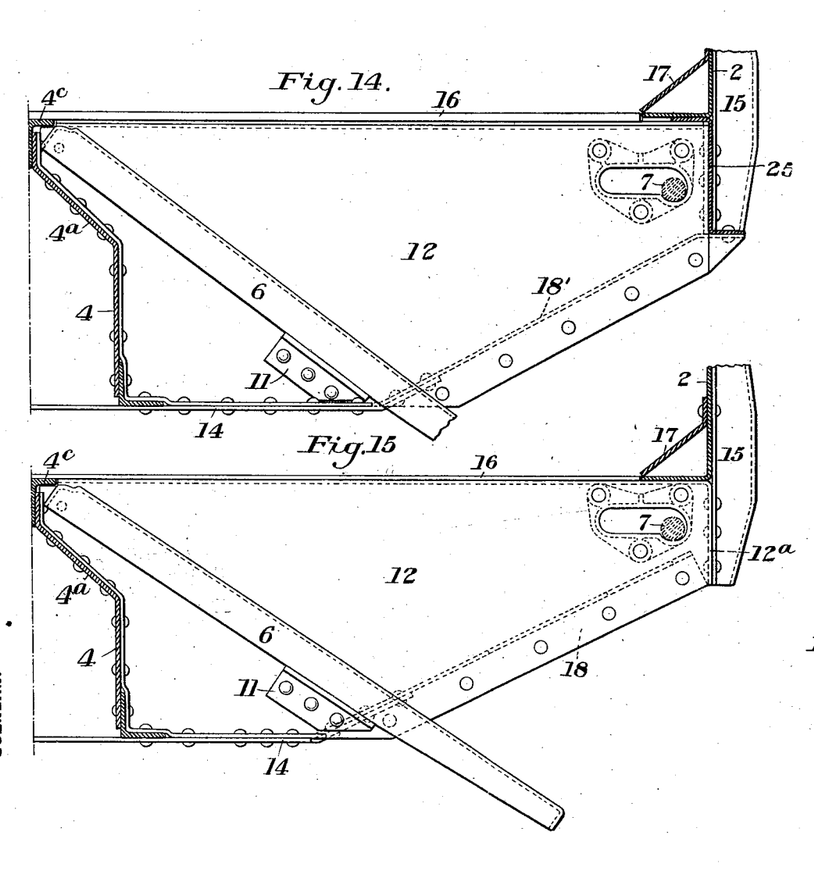
Figs. 14 and 15 are views similar to Fig. 4, but showing other modifications.

The construction shown in Fig. 14 is generally similar to that shown in Figs. 12 and 13, except that a Z-bar 25 is used in place of the angle 24, to the bottom flange of which bar the reinforcing channel 18′ is secured at its upper outer ends.

Figure 16:
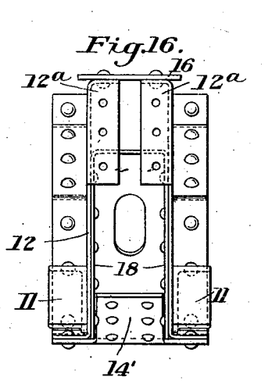
Fig. 16 is an end view of the construction shown in Fig. 15 with the side sheet removed.

The construction shown in Figs. 15 and 16, is similar to that of Fig. 14, except that the Z-bar 25 is omitted, and the end portions 12ª are secured directly to the downward extensions of the stake irons.

Figure 17:
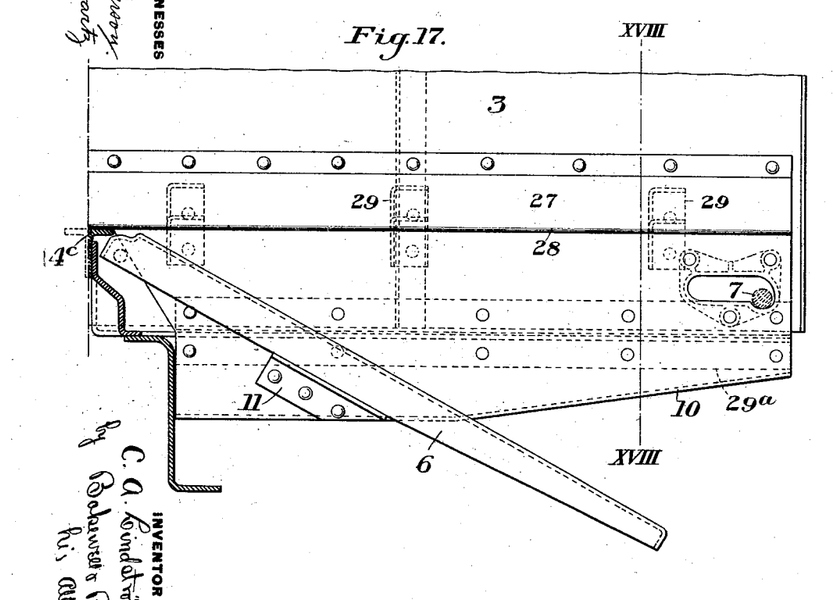
Fig. 17 is an end view of one-half of the car, as seen from the inside.
Figure 18:
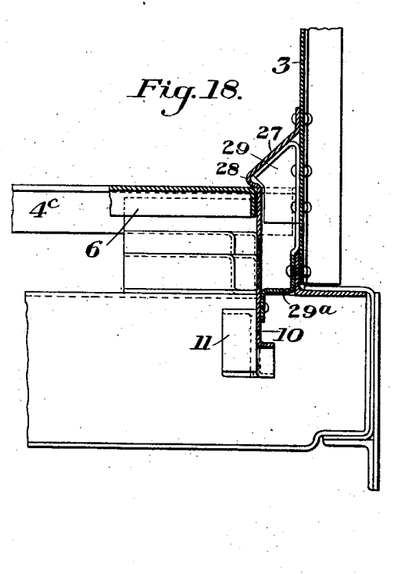
Fig. 18 is a section on the line XVIII—XVIII of Fig. 17, with the door in closed position.

Figs. 17 and 18 show one form of construction of one of the end sills or diaphragms. This is shown as formed by a strip or plate whose upper edge portion 27 is secured to the end sheet 3, and forms an end shedding strip having an overhang 28, below which it is carried vertically downward to form the guard for the edge of the end door, its function being similar to the side members of the other diaphragms.

This plate is reinforced by means of the bent brackets 29 and Z-bar 29ª secured to the end sheet 3 at proper intervals.

Figure 19:
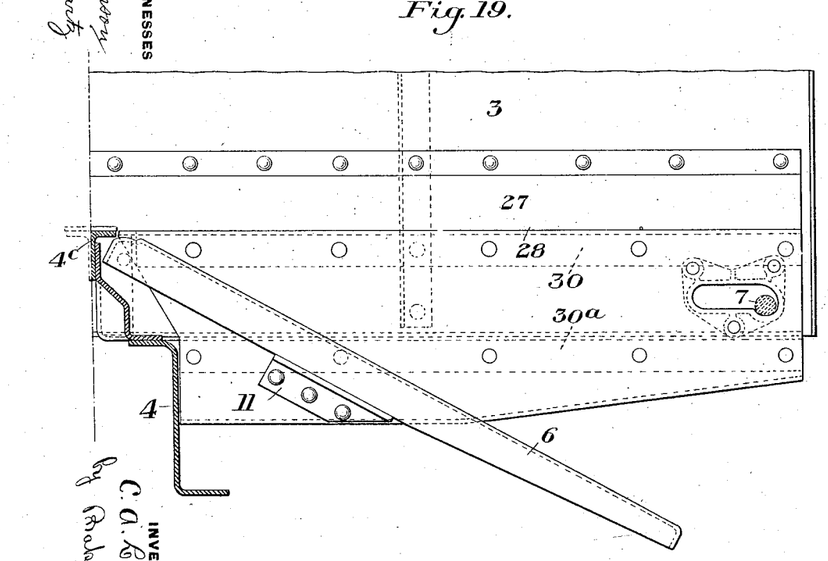
Figs. 19 and 20 are views similar to Figs. 17 and 18, showing a modified construction.
Figure 20:
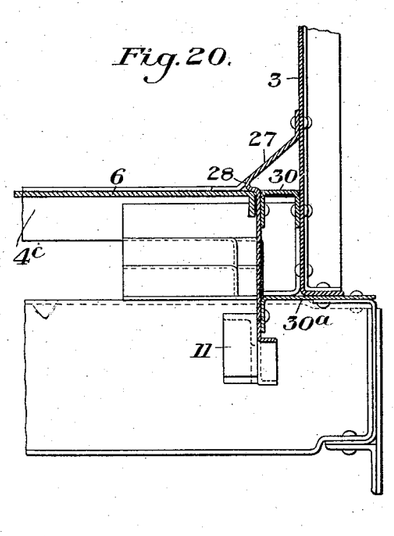

In Figs. 19 and 20 a similar end diaphragm is shown with the exception that instead of the reinforcing brackets 29, the continuous reinforcing members 30 and 30ª are placed between the vertical portion of the diaphragm, and the end sheet 3 of the car.

Figure 21:
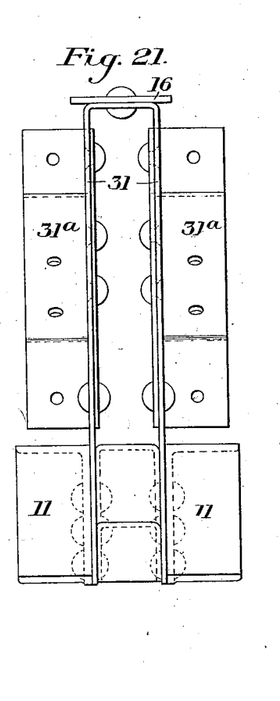
Fig. 21 is an end view of another construction of diaphragm.

Fig. 21 shows a diaphragm formed by a single plate 31, which is bent to form its top and side members, with angles 31ª riveted thereto.

Figures 22, 23, 24, 25, 26, 27, 28:
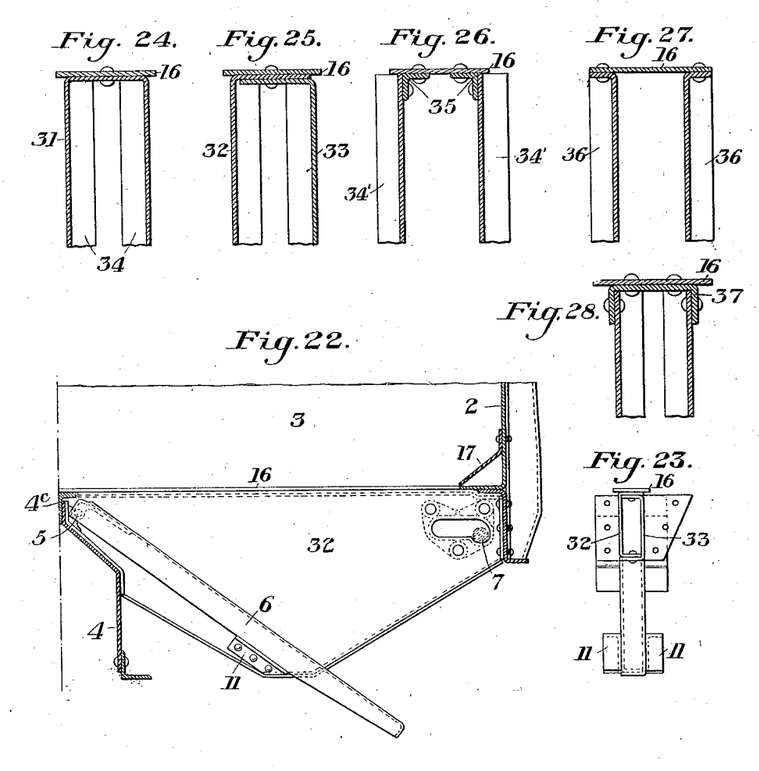
Fig. 22 is a cross-sectional view of one-half of the car showing a further modification.
Fig. 23 is an end view of the diaphragm shown in Fig. 22 with side sheet removed.
Figs. 24, 25, 26, 27 and 28 are detail views showing different ways of constructing the cross members or diaphragms.

Figs. 22 and 23 shows diaphragms formed of two channel members 32 and 33 having their horizontal flanges overlying each other to form the top and bottom members of the diaphragm.

Figs. 24, 25, 26, 27 and 28 show different ways of constructing the upper portion of the diaphragm. Fig. 24 shows a construction similar to Fig. 21, formed of a single plate with a floor plate 16 riveted thereto, and with inturned end flanges 34; Fig. 25 shows the diaphragm formed of two members as in Figs. 22 and 23, with the floor plate riveted thereto; Fig. 26 shows internal angles 35 for carrying the floor plate, and the end flanges 34 bent outwardly instead of inwardly, and Fig. 27 shows the upper edges of the side members bent outwardly to form flanges 36 to support the floor plate. In the construction shown in Fig. 28 a separate channel 37, either rolled or pressed, is riveted to the side plates to form the top portion.

Throughout the several forms herein described it is, of course, obvious that separate angles may be employed instead of the integral flanges described without departing from the scope of the invention, and where the term "flange" is used in the claims it is desired to cover either integral or separate strengthening or connecting strips.

It will be obvious that various other forms of construction may be employed within the spirit and scope of my invention, since

What I claim is:—

1. In a dump car, a beam, or cross-bearer formed of metal diaphragms having outwardly projecting flanges at their inner ends and along their lower edges, and inwardly projecting flanges at their outer ends and along their upper edges.

2. In a dump car, a beam or cross-bearer consisting of metal diaphragms having outwardly projecting flanges at their inner ends and along their lower edges, inwardly projecting flanges along their upper edges and stiffening means interposed between said diaphragms at their outer ends.

3. In a dump car, a beam or cross-bearer consisting of metal diaphragms having outwardly extending flanges at their inner ends and along their lower edges, inwardly extending flanges along their upper edges and at their outer ends and stiffening means interposed between said diaphragms at their outer ends.

4. In a dump car, a box beam or cross-bearer consisting of metal diaphragms tied together and extending from longitudinal center to side of the car, having strengthening flanges extending in one direction at its lower inner end portion and having strengthening flanges extending in the opposite direction at its upper outer end portion.

5. In a dump car, a beam or cross-bearer consisting of a pair of metal diaphragms having inwardly extending flanges along their upper and outer edges, and a perforated tie member interposed between said members at its forward end.

6. In a car, an end shedding strip secured to the end sheet of the car and having a vertical depending portion extending below the car floor to form a door guard; substantially as described.

7. A car having an end shedding strip provided with a vertical depending portion extending below the car floor to form a door guard, and a reinforcing member between the depending portion and the end sheet of the car; substantially as described.

8. A car having an end shedding strip provided with a vertical depending portion extending below the car floor to form a door guard, and a plurality of reinforcing members between the depending portion and the end sheet of the car; substantially as described.

9. In a car, an end shedding strip secured to the end sheet of the car and having a vertical depending portion extending below the car floor to form a door guard, said depending portion being spaced from the end sheet of the car; substantially as described.

In testimony whereof, I have hereunto set my hand.

CHARLES A. LINDSTRÖM.

Witnesses:
HARRY B. FISHER,
GEO. H. PARMELEE.